Oct. 4, 1955

F. WEST, JR 2,719,502

AUTOMATIC PILOT FOR SHIPS

Filed June 8, 1951

2 Sheets-Sheet 1

INVENTOR
FRANCIS WEST, JR
BY
Herbert H. Thompson
his ATTORNEY.

INVENTOR
FRANCIS WEST, JR
BY
Herbert H. Thompson
his ATTORNEY.

United States Patent Office 2,719,502
Patented Oct. 4, 1955

2,719,502

AUTOMATIC PILOT FOR SHIPS

Francis West, Jr., Westbury, N. Y., assignor to Sperry Rand Corporation, a corporation of Delaware Application June 8, 1951, Serial No. 230,495

11 Claims. (Cl. 114—144)

This invention relates to automatic pilots for dirigible craft, and more especially to the automatic steering of ships, although many features have application to airplanes and to their control in pitch and bank as well as in azimuth.

One object of the invention is to simplify and improve a form of ship's automatic pilot or gyropilot in which the same handwheel is employed for changing course while under the control of the automatic pilot that is employed for hand servo control, which last is usually termed "hand-electric control." An example of such a gyropilot is shown in the prior patent to Elmer A. Sperry, Jr., No. 1,772,788, dated August 12, 1930, for Automatic Pilots. It is thus a multi-steering arrangement. By my invention means are provided for insuring that the rudder will never be thrown hard-over or through a large angle either when the steering engine or rudder servomotor is thrown in, or at any time when the automatic steering is in operation, leaving, however, the servo system such that large movements of the rudder may be secured through the steering engine if ordered through the hand-electric control, but assuring that only quite limited servo operated rudder displacements can occur, excepting only when the hand-electric control is in operation and a large course change is ordered.

Further improvements over prior systems consist in the simplified method of damping the yaw of the ship by a rate of turn factor secured from the gyro compass used for course maintenance in the automatic pilot.

A further improvement lies in the simplification of the adjustments in the steering system which may be effected, whereby the ratio of rudder displacement to departure from course may be varied at will and also the sensitivity of the device for different wave (i. e., weather) conditions, both by simple potentiometer adjustments.

The present application discloses and claims a substantial part of the automatic pilot system disclosed but not claimed in the U. S. Patent of O. B. Whitaker and applicant, No. 2,688,130 for Radar Pilot, dated August 31, 1954, as distinct from the radar portion of the invention and to that extent this application is a continuation-in-part of my aforesaid patent, the claims herein which are readable upon the aforesaid patent being the sole invention of applicant, with particular reference to Fig. 3 of the aforesaid patent.

Figure 1:
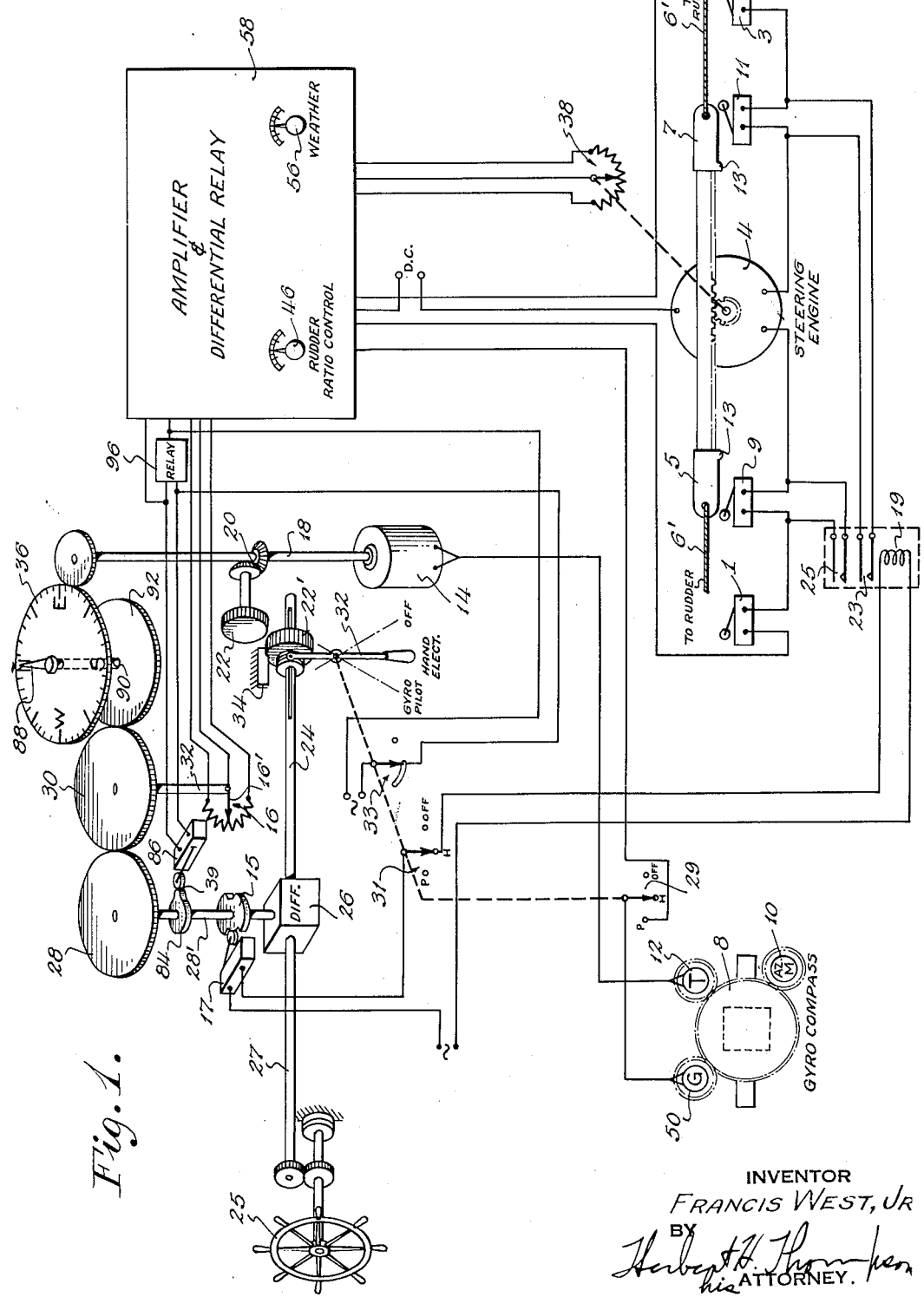
Figure 2:
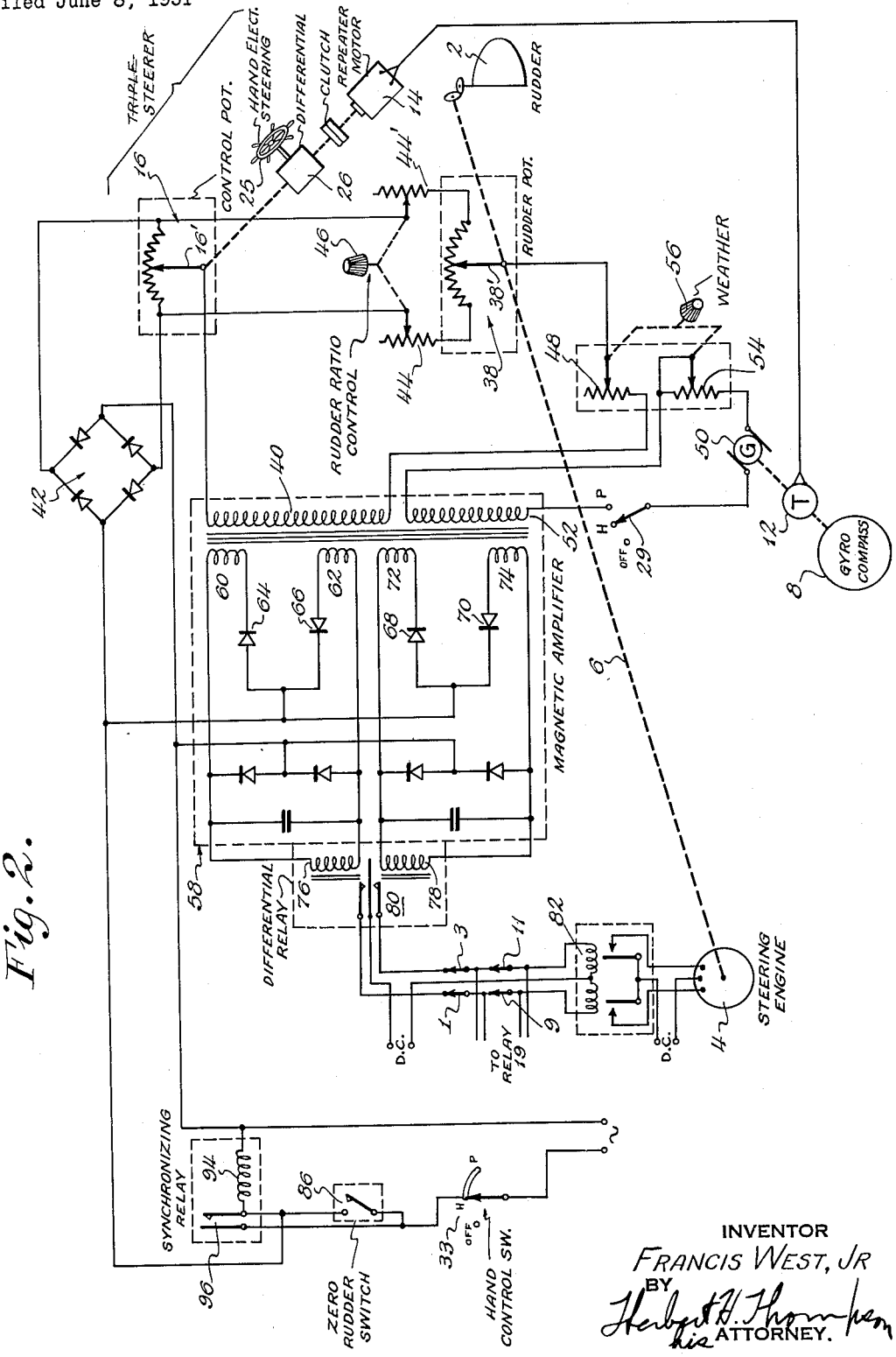

Referring to the drawings illustrating diagrammatically a preferred form of the invention, Fig. 1 is an elementary diagram of my improved automatic pilot with that portion of the electric circuits particularly pertaining to my improved limit switches; and Fig. 2 is a more detailed wiring diagram of certain other portions of the invention particularly pertaining to the rudder servo system and its adjustments, but many parts being common to both figures.

As represented, the ship's rudder 2 is normally controlled from some form of steering engine which is shown as an electric motor 4 connected to the rudder through shafting 6 or cable 6', as in Figs. 2 and 1, respectively. When the ship is being steered automatically, the course is maintained from the ship's gyro or other compass 8, which is usually provided with an azimuth motor 10 driving the follow-up system and transmitter 12 which transmits the compass heading to repeater compasses. In the steering stand or multi-steerer is provided a repeater motor 14 actuated from transmitter 12 which normally positions the repeater compass card 36 and main controller 16 of the automatic pilot which according to the present invention is a potentiometer. The servomotor 4 or steering engine is hence primarily governed by said controller 16. Repeater motor 14 is shown as turning the slider 16' thereof through shaft 18, bevel gears 20, meshing pinions 22, 22', shaft 24, differential 26 and gearing 28, 30, the slider being shown as secured to the shaft 32 of gear 30. The third arm of differential 26 is turned from steering wheel 25 through shaft 27, so that course changes may be effected at will through the automatic pilot. As stated, when steering automatically, the gears 22, 22' are in mesh, but when steering by the hand-electric system, the clutch handle 32 of the gyropilot is placed in the position shown in Fig. 1, in which the gear 22' is slid to the left along its splined shaft 24 to disengage it from the gear 22 and engage it with a locking rack 34 to lock that side of differential 26. Further movement of the handle 32 counterclockwise disconnects electrical power through switch 33 for shutting down the system, in which case the rudder may then be controlled by direct manual operation (not shown). Pointer 88 on shaft 90 concentric with card 36 is rotated from gears 30 and 92 and hence operates as a course selector or indicator when steering automatically and a rudder order indicator when hand-electric control is being used.

Also controlling the steering motor is a follow-back controller 38 in the form of a second potentiometer, the slider of which is turned from the rudder or steering engine 4 and constitutes a secondary control for the motor 4. The course displacement signal is supplied by potentiometer 16 and the rudder follow-back signal from potentiometer 38. The two potentiometers are shown as resistors (Fig. 2) connected across a direct current supply from rectifier 42, the displacement signal from slider 16' being connected to one end of control winding 40 of a suitable amplifier, and the follow-back signal from slider 38' connected to the other end of said winding, so that the two act in opposition in the form of a Wheatstone bridge.

I also associate with this network several important adjustments and anti-hunt arrangements so that the sensitivity, the ratio of rudder throw and an anti-hunt system for the rudder may be adjusted to suit various sea conditions and characteristics of the ship. To these ends I insert between the supply and potentiometer 38, variable resistors 44, 44' which are adjusted together from a knob 46 which I term a "rudder ratio control" adjustment. By this means, the amount of rudder throw per degree of displacement of the ship from course (or the error signal) is adjusted by varying the amount the follow-back slider 38' or potentiometer 38 has to move to balance the potential at slider 16'. This is an important adjustment, since more rudder is required when the ship is going slowly or heavily loaded than at full speed or in ballast.

I also interpose a variable resistor 48 between the differential output of the potentiometers 16 and 48 and the amplifier 40. Adjustment of knob 56 thereof adjusts the over-all sensitivity of the device and is varied to suit the weather conditions and is hence termed a weather or sensitivity adjustment.

As a means for damping the yaw of the ship and securing greater initial rudder throw, I employ an auxiliary generator 50 preferably of the permanent magnet D. C. type driven from the follow-up system of the gyro compass (see Fig. 1). This supplies a voltage proportional to the rate of turn of the ship and varying in direction or polarity with the direction of turn. Its output may be also fed into the magnetic amplifier, to be combined with the primary control signal from potentiometers 16 and 38. It is shown as connected to an auxiliary winding 52 of control winding 40 (Fig. 2), so that the signal from it is either added to or opposes the signal from the control potentiometers according to whether or not the ship is departing from the desired course or going toward the same. If the ship yaws away from the desired course, the net signal from the control potentiometers will, of course, be in a direction to stop such departure and at this time the signal from the rate generator is in a direction to aid in opposing such departure. When the ship starts to turn back to its course, the signal from the rate of turn generator will reverse while the signal from the control potentiometer remains in the same direction so that the two signals are then opposed, the rudder will be brought back to near amidships, and the ship will be more slowly brought back to course without overshooting. When a new course is set up by the course change handwheel 25 during automatic pilot operation, the rate signal in general will oppose the course change signal and thus limit the rate of turn, which is desirable, but will never prevent it, so that the ship will come to the new course in a deadbeat manner.

During hand-electric control, I prefer to cut out the rate of turn generator 50. To this end, I have shown cut-out switch 29 which is opened with the handle 32 in the off position (Fig. 1). Resistor 54 is placed in series with the output of the generator 50 for the purpose of attenuating the rate of turn signal and the damping factor resulting therefrom. Preferably, this resistor is varied from the same knob 56 which varies the weather or sensitivity adjustment since in general the output of the turn generator should be decreased when the sensitivity of the displacement signal is decreased.

The illustrated amplifier 58 is a magnetic (saturable reactor) type amplifier, although other types may be used, if desired. The balanced outputs from the potentiometers and rate generator are connected, as stated, to the control windings 40 and 52 of the saturable reactor 58, while pulsating current is supplied to the output windings of the same. The current in the control winding 40 will be zero when the input bridge is in balance and will reverse upon increasing unbalance of the bridge. In other words, when the output from the control potentiometer 16 is not balanced by the rudder feedback potentiometer 38, there will be an appropriate control input, the effect of which is modified, however, by whatever voltage is supplied to the winding 52 on the same core furnished from the rate generator 50. The current in the reactor output windings 60, 62 always flows in the same direction due to the arrangement of the associated rectifiers 64, 66, 68, 70. The same is true of the output coils 72, 74 due to the corresponding rectifiers.

Therefore, according to conventional magnetic amplifier theory, the direct current core flux set up by the control windings 40, 52, aids the current in one set of output windings and opposes in the other set, thereby providing an amplified signal which energizes either one of the oppositely polarized output coils 76, 78 to indirectly control the steering engine 4. In the system shown said coils control a differential relay 80, which energizes a power motor control relay 82 to actuate the steering motor 4 in the desired direction, but obviously other amplifying systems may be employed, if desired.

As indicated above, my system through handle 32 may be thrown from off (in which position straight hand control is used) to servo motor operation, i. e., either hand-electric or gyropilot, at will, but means are provided to prevent the servo motor controls from being thrown in unless the rudder is centered at the time. For this purpose, I have shown on the shaft 28' of one of the course setting gears 28, a cam 84, the raised portion only of which closes a normally open "zero rudder" switch 86, when the pointer 88 which operates as a rudder order indicator during hand-electric steering and as a course selector when steering automatically, is pointing to zero at the top of the dial. Therefore, if the handle 32 is moved into the hand-electric or gyropilot position when the cam 84 is in any position but that shown in Fig. 1, the servo system will not come into operation because the main supply is broken at the switch 86. The helmsman will therefore have to move the handwheel 25 to center the pointer, before the servo system becomes operative. As soon as such condition is reached, however, the switch 86 is closed which completes a circuit through the hold-in coil 94 of the self-locking relay, thereby closing the contacts 96 therein which thereafter remain closed until the servo system is thrown out of operation. By this means, sudden unexpected turns of the ship are prevented when throwing in the servo control.

It should also be noted that unanticipated turns cannot be caused when throwing the multi-steerer from hand-electric to gyropilot or vice versa, unless the helmsman has turned the handwheel 25 for a turn thus setting the rudder order indicator off center. When steering a straight course, the rudder order indicator will always be at zero so that when the automatic pilot is thrown in the ship will be steering a straight course and will remain on that course, the repeater motor 10 being stationary at the time. If, however, a turn has been ordered at the time of the transfer, the automatic pilot will continue to turn the ship until the new course set by the pointer 88 is achieved, so that the ship will continue to turn until the new course is reached.

As an important and further safety factor in automatic steering, I have provided a means for preventing rudder throw of more than a few degrees at any time while the automatic pilot is in operation or in fact at any time during hand-electric operation, except when the helmsman sets in a large course change by handwheel 25. Since I have found that a rudder throw of a few degrees, say up to 10 degrees, is sufficient to maintain the ship on its course under all ordinary conditions and it is also sufficient to make moderate turns of the ship at normal speed of the ship during operation on the high seas under which conditions sudden sharp turns of the ship are not needed and undesirable. It is recognized, however, that such rudder limiting means should not be effective if the helmsman orders a sharp turn when steering by hand-electric control.

To achieve the above purposes, I provide in addition to the normal limit switches 1 and 3 which are associated with cams 5 and 7 connected to the rudder, additional more closely positioned limit switches 9 and 11, which are normally closed, but one of which is opened by a rudder movement of, say, more than 10 degrees, in each direction by raised portions 13 on the cams 5 and 7. When switch 9, for instance, is depressed, the main circuit to the steering engine is opened, and the same is true, of course, when switch 11 is depressed.

It should be noted that this action takes place whether the ship is being steered through the automatic pilot or by the hand-electric control. Therefore, in case of any mechanical or electrical failure which might otherwise cause the steering motor to run until the rudder is hard-over (i. e., to outside limit switches 1 or 3) such a dangerous condition would be prevented and the rudder limited to a small predetermined deflection as defined by close limit switches 9 or 11 which give the helmsman time to assume direct manual control of the rudder and correct the course before material deviation had taken place.

However, in case the helmsman is steering by the hand-electric control and orders a large course change through wheel 25, I provide means to disable the close limit cutouts under such conditions only, leaving, of course, the limit stops 1 and 3 in operation at all times. For this purpose, I provide on a shaft connected to the rudder order pointer 88, such as shaft 28' of gear 28, a double cam 15 in which the low portions on each side are of sufficient width to leave the switch 17 operated thereby open, unless a predetermined rudder limit of say 8 to 10 degrees on either side of center is ordered. In this case, the higher portions of the cam will be reached closing said switch and exciting relay 19 to close short-circuiting contacts 21 and 23, which thereby render ineffective the opening of either switch 9 or 11 when the limit is reached. Therefore, as long as (and only as long as) the helmsman calls for a rudder deflection of more than a predetermined amount, the steering engine will be able to deflect the rudder more than the 10 degree limit.

Also, the above action can only take place when selector handle 32 is in the hand-electric position, and not in the gyropilot position, since in the circuit for switch 17 there is also placed a switch 31 which renders the relay coil 19 inoperative unless the pilot handle 32 is in the hand-electric position. A third switch 33 is also shown operated from the selector handle 32, for completing the proper circuits for the type of control desired, i. e., automatic, hand-electric or direct hand or off.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In an automatic pilot for ships, a ship's compass, means actuated thereby for generating a signal varying in magnitude and sign with the ship's deviation from course, a rudder servomotor, a follow-back signal generator for generating a signal varying in magnitude and sign with rudder deflection, said motor being controlled by the difference of said signals, a variable impedance for reducing the second signal as compared to the first signal for increasing rudder throw, a second variable impedance for attenuating the over-all sensitivity of the control, and common means for adjusting both of said impedances for weather conditions.

2. In an electrical automatic pilot for ships having a gyro compass with a transmission system, a course controller containing a repeater actuated from said transmission system and generating a signal reversible with and proportional to course error, a rudder servomotor, a hand wheel for also operating said course controller in two modes of operation, i. e., differentially with said repeater and solely by hand, a handle for selecting either of said modes, a follow-back controller governed by said motor, and generating a countersignal reversible with and proportional to rudder displacement and a generator driven by said system and generating a signal reversible with and proportional to the speed at which it is driven, means for controlling said motor from a combination of said signals such that the first signal is always opposed by said second signal, but is aided by the third signal upon initial departure from course and opposed as the ship returns to course, and means for rendering the signal generated by said speed generator ineffective when steering by hand-electric control.

3. In an automatic steering device for ships having a rudder steering motor, a steering stand, a rotatable compass card with a fixed lubber line thereon, an electrical controller for said steering motor, a differential having one side connected to said controller to turn the same, a compass repeater motor actuating said card and another side of said differential, a course setting hand wheel for actuating another side of said differential to displace said controller to change course, means for also controlling said controller solely from said hand wheel including means for locking the compass side of said differential and for severing the repeater motor control, and a pointer concentrically mounted adjacent said compass card and turned by said controller, whereby said pointer indicates approximately the rudder displacement when steering solely by said hand wheel and the desired course when steering automatically.

4. In an automatic pilot for ships having a gyro compass with a transmission system, a course controller primarily governed by a repeater actuated by said system and generating a signal reversible with and proportional to course error, a rudder servomotor, a follow-back controller governed by said motor generating a countersignal reversible with and proportional to rudder displacement and a generator driven by said system and generating a signal reversible with and proportional to the speed at which it is driven, said motor being controlled from a combination of said signals such that the first signal is always opposed by said second signal, but is aided by the third signal upon initial departure from course and opposed as the ship returns to course.

5. In an automatic pilot for ships having a gyro compass with a transmission system, a course controller primarily governed by a repeater actuated by said system and generating a signal reversible with and proportional to course error, a rudder servomotor, a follow-back controller governed by said motor, and generating a countersignal reversible with and proportional to rudder displacement, a generator driven by said system and generating a signal reversible with and proportional to the speed at which it is driven, said motor being controlled from a combination of said signals such that the first signal is always opposed by said second signal, but is aided by the third signal upon initial departure from course and opposed as the ship returns to course, and means for attenuating the speed signal to vary the ratio of rate of turn signal with respect to the other signals.

6. In an automatic pilot for controlling the rudder of dirigible craft, a servomotor for positioning the craft's rudder, a position maintaining instrument, a course controller primarily governed by said instrument, and comprising a primary resistor across a supply line and having a variable mid-tap positioned from said instrument, a secondary resistor having a variable mid-tap positioned from said motor, a pair of variable resistors one between each end of said second resistor and the supply, a rudder ratio knob for adjusting together said pair of variable resistors, a third variable resistor in series between at least one of said mid-traps and the servomotor control, and a weather or sensitivity knob for adjusting said last named resistor whereby the amount of rudder movement per unit movement of said first mid-tap may be varied to vary the ratio of rudder movement to course error, and the over-all sensitivity of the control may be varied for different weather conditions.

7. An automatic pilot for ships having a gyro compass with a transmission system, a course controlling means primarily governed from said system and providing a first signal, a rudder servomotor governed in part by said signal, a followback controller driven thereby and providing a second signal for said motor, and means providing a third control signal proportional to the rate of turn of the ship for also governing said motor including a generator rotated from said compass as the ship turns which generates a voltage proportional to and varying with its speed and direction of rotation.

8. An automatic pilot for ships including a steering stand and rudder steering motor, a repeater compass card with a fixed lubber line therefor, a primary and a followback controller for said motor, a compass repeater motor for rotating said card, a course setting hand wheel, means for differentially controlling said primary controller from said repeater motor and hand wheel, means for also controlling said controller solely from said hand wheel including means for severing the repeater motor control therefrom, and a pointer mounted concentrically with said compass card and turned by said primary controller and providing a reference with respect to both said card and lubber line, whereby said pointer indicates the ordered rudder displacement when steering solely by said hand wheel and the desired course when steering automatically.

9. A multi-steerer for ships including an automatic pilot, an electrically controlled rudder servomotor, a hand wheel, a master electric controller for said motor, differential means for governing said controller during automatic steering jointly from said automatic pilot and said hand wheel, a handle for interrupting the control of said controller from said automatic pilot whereby the controller is governed solely from said hand wheel for hand-electric steering, extreme limit switches between said controller and motor to limit over-all rudder throw, extra close limit switches also between said controller and motor to further limit rudder throw to a few degrees, and a switch operated by said handle when in the hand-electric position for rendering said close limit switches ineffective to limit rudder throw, whereby when steering through said multi-steerer rudder throw in excess of predetermined close limits cannot be caused as long as the automatic pilot is at least partially controlling the rudder.

10. A multi-steerer for ships including an automatic pilot, an electrically controlled rudder servomotor, a hand wheel, a master electric controller for said motor, differential means for governing said controller during automatic steering jointly from said automatic pilot and said hand wheel, a handle for interrupting the control of said controller from said automatic pilot whereby the controller is governed solely from said hand wheel for hand-electric steering, extreme limit switches between said controller and motor to limit over-all rudder throw, extra close limit switches also between said controller and motor to further limit rudder throw to a few degrees, a switch operated by said handle when in the hand-electric position for rendering said close limit switches ineffective to limit rudder throw, whereby when steering through said multi-steerer rudder throw in excess of predetermined close limits cannot be caused as long as the automatic pilot is at least partially controlling the rudder, and means for preventing control of said servo motor by said master controller from being rendered operative unless and until the rudder is centered.

11. An automatic pilot for ships including a controller, a servomotor for operating the rudder and electrically controlled from said controller, a compass element normally controlling said controller, a hand wheel for also jointly controlling said controller with said compass element, means for connecting and disconnecting said compass element from said controller, maximum rudder limit stop means for said servo, auxiliary close limit stop means for said servo normally limiting rudder movement to about 10° from normal in either direction, first means for rendering said close limit stop means temporarily ineffective, second means operated from said connecting and disconnecting means for preventing said first means from becoming operative whenever the compass element is connected to said controller, and third means operated by a displacement of the hand wheel in excess of a small predetermined amount when said compass element is disconnected for actuating said first means, whereby said close limit stop means are operative except when a substantial rudder displacement is ordered solely by the hand wheel.

References Cited in the file of this patent

UNITED STATES PATENTS

| | | |
|---|---|---|
| 1,725,599 | Sperry, Jr. | Aug. 20, 1929 |
| 1,818,103 | Sperry | Aug. 11, 1931 |
| 2,102,513 | Chance | Dec. 14, 1937 |
| 2,120,950 | Hodgman | June 14, 1938 |
| 2,387,795 | Isserstedt | Oct. 30, 1945 |
| 2,416,097 | Hansen, Jr., et al | Feb. 18, 1947 |
| 2,466,702 | Hamby | Apr. 12, 1949 |
| 2,503,346 | Meredith | Apr. 11, 1950 |

FOREIGN PATENTS

| | | |
|---|---|---|
| 592,766 | Great Britain | Sept. 29, 1947 |